United States Patent [19]

Kitagawa et al.

[11] Patent Number: 4,903,130
[45] Date of Patent: Feb. 20, 1990

[54] BROADCAST SATELLITE RECEIVER

[75] Inventors: Keiko Kitagawa, Tokyo; Osamu Yamakami, Kanagawa, both of Japan

[73] Assignee: Sony Corporation, Tokyo, Japan

[21] Appl. No.: 289,670

[22] Filed: Dec. 27, 1988

[30] Foreign Application Priority Data

Jan. 12, 1988 [JP] Japan ................... 63-004389

[51] Int. Cl.⁴ .................. H04N 5/262; H04N 5/63
[52] U.S. Cl. ................... 358/190; 358/181; 455/343
[58] Field of Search ............ 358/190, 181, 188, 191.1, 358/93, 337, 320; 455/343, 3; 340/825.22, 825.24

[56] References Cited

U.S. PATENT DOCUMENTS

| 3,962,532 | 6/1976 | Aubert | 358/190 |
| 3,979,599 | 9/1976 | Amemiya | 358/190 |
| 4,481,429 | 11/1984 | Christopher | 358/190 |
| 4,591,914 | 5/1986 | Hakamada | 455/343 |
| 4,651,342 | 3/1987 | Mengel | 358/190 |
| 4,766,491 | 8/1988 | Saitoh | 358/181 |

Primary Examiner—Tommy P. Chin
Attorney, Agent, or Firm—Alvin Sinderbrand

[57] ABSTRACT

In a broadcast satellite receiver having a power source circuit for supplying a power source voltage to a tuner circuit through a power switch and a socket or receptacle for connecting an external appliance, such as, a video tape recorder, to the power source circuit; power consumption by the video tape recorder connected through the socket or receptacle to the power source circuit of the receiver is detected, and the power switch is closed for operating the tuner circuit when the detected value of power consumption by the video tape recorder is characteristic of operation of the latter, for example, when the power consumption exceeds by a predetermined amount a previously detected value of power consumption in a standby condition of the video tape recorder.

11 Claims, 5 Drawing Sheets

BROADCAST SATELLITE RECEIVER

BACKGROUND OF THE INVENTION

1. Field of the Invention

This invention relates generally to broadcast receivers and, more particularly, is directed to broadcast receivers intended for use in combination with external appliances, such as, video tape recorders.

2. Description of the Prior Art

A rise of interest in satellite broadcasting in recent years has been reflected in a substantially increased number of satellite broadcast receivers in use by members of the general population. Since satellite broadcasting of television programing is presently conducted throughout the entire day, that is, for 24 hours, so as to make efficient use of the limited number of satellites available for that purpose, it is necessary that at least the television programs broadcast during off-hours, that is, during working or sleeping hours, be recorded by a timer-controlled video tape recorder for subsequent playback and viewing. However, conventional video tape recorders (VTRs) seldom include an interlocking power source terminal or socket in which the plug of the power supply cord of a receiver can be inserted for interlocking operation of such receiver with the VTR under the control of the built-in timer of the VTR. Therefore, either a built-in timer of the receiver or tuner or an external timer for controlling the receiver or tuner, and the built-in timer of the VTR are set independently of each other. In addition to the setting of the built-in timer of the VTR and of the external or built-in timer of the tuner or receiver, a tape loading operation is performed and the VTR is then placed in its standby condition immediately before the time at which recording of the broadcast television signal is to commence, which time is hereinafter referred to as a "reserved picture recording time". In such case, at the reserved picture recording time, operation of the tuner for receiving and demodulating the broadcast signal and recording operation of the VTR are simultaneously commenced. Then, after the lapse of a predetermined interval of time, the operation of the tuner and the recording operation of the VTR are similarly halted. However, since the built-in or external timer for the tuner and the built-in timer of the VTR have to be independently set, the setting operations are undesirably complicated, and are susceptible to errors.

OBJECTS AND SUMMARY OF THE INVENTION

Accordingly, it is an object of this invention to provide a receiver, such as, a broadcast satellite receiver, which can be connected with an external appliance such as, a VTR, and which avoids the above mentioned disadvantages of the prior art.

More specifically, it is an object of this invention to provide a receiver which can be interlocked with an external appliance, such as, a VTR, having a built-in timer, so as to make the receiver operative simultaneously with the external appliance in response to the simple setting of the timer in the latter.

In accordance with an aspect of the present invention, a receiver is provided with a power source circuit, a tuner circuit, power switching means for controlling the supplying of a power source voltage from the power source circuit to the tuner circuit for operating the latter, coupling means, such as, a socket or receptacle for connecting an external appliance, such as, a VTR, to the power source circuit of the receiver, detecting means for detecting values of power consumption by the external appliance connected through the coupling means to the power source circuit, and controlling means responsive to the detected values of power consumption for closing the power switching means, and thereby operating the tuner circuit, when the detected value of power consumption exceeds by a predetermined amount, a previously detected value of power consumption by the external appliance in a standby condition of the latter. In the foregoing receiver according to this invention, the detected value of power consumption which exceeds, by a predetermined amount, the previously detected value of power consumption is characteristic of an operating condition of the external appliance so that the tuner circuit and the external appliance are operative in an interlocking manner, for example, under the control of built-in timer of the external appliance.

In accordance with another feature of this invention, mode selecting means are connected with the aforementioned controlling means and are selectively operative to establish an interlocking mode in which the tuner circuit is operative simultaneously with the external appliance, and a non-interlocking mode in which the tuner circuit is operative independently of the external appliance.

In accordance with still another feature of this invention, start-stop means are associated with the mode selecting means and are operative, in the non-interlocking mode, to cause the controlling means to close the power switching means for operating the tuner circuit in response to an initial actuation of the start-stop means and to open the power switching means for halting operation of the tuner circuit in response to a subsequent or second actuation of the start-stop means.

The above, and other object, features and advantages of the invention, will be apparent in the following detailed description of a preferred embodiment thereof when read in connection with the accompanying drawings in which corresponding parts are identified by the same reference numerals in the several views.

DESCRIPTION OF THE PREFERRED EMBODIMENT

Figure 1:
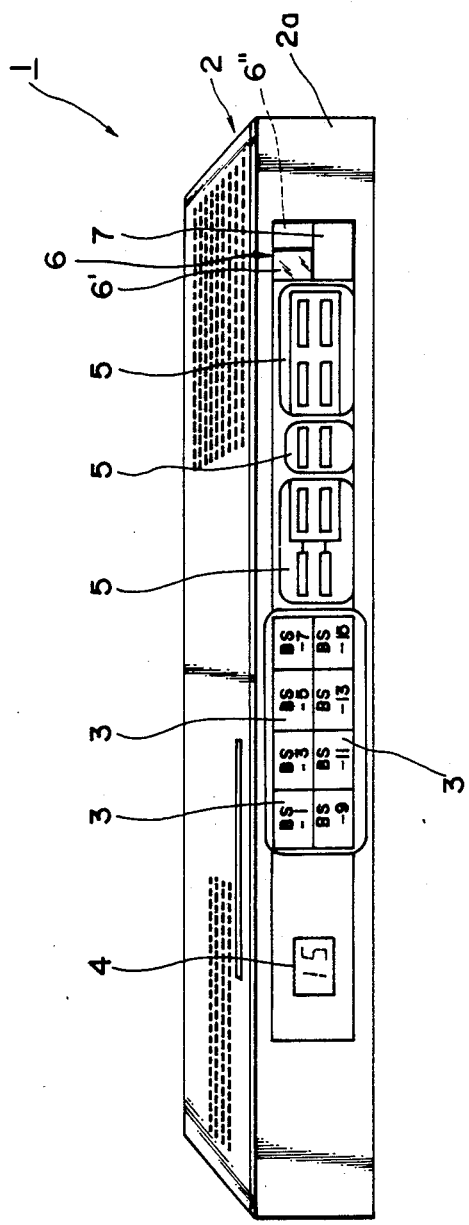
FIG. 1 is a perspective view of a broadcast satellite receiver in accordance with an embodiment of this invention, and which is shown as viewed from the front.
Figure 2:
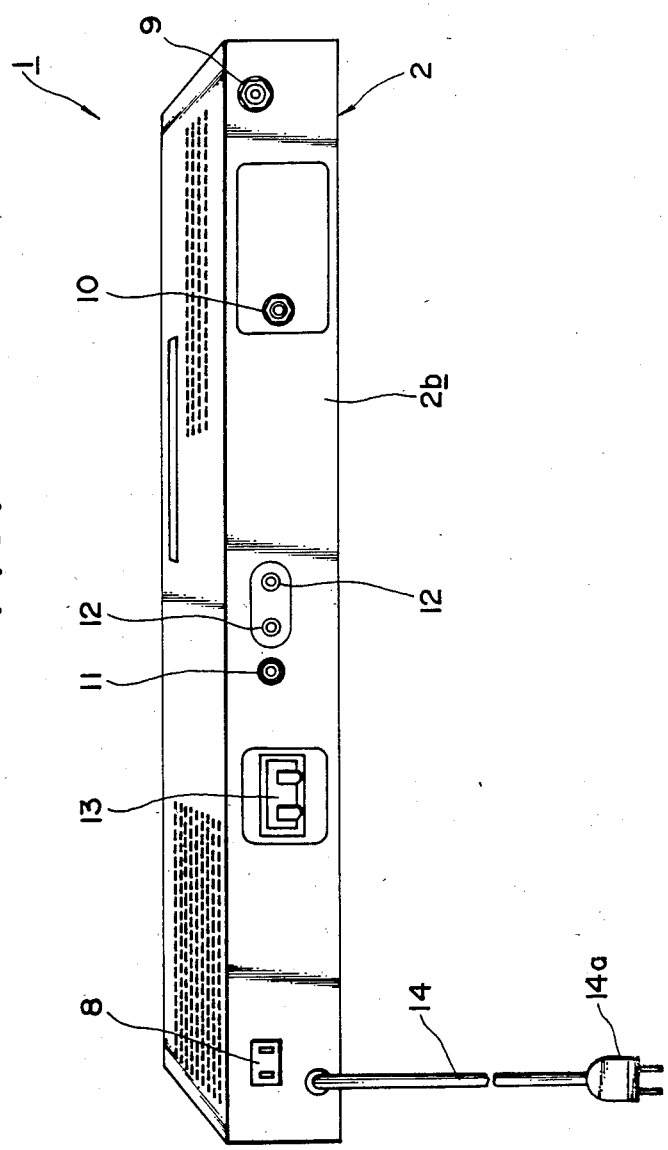
FIG. 2 is a perspective view of the broadcast satellite receiver of FIG. 1 as viewed from the rear.

Referring to the drawings in detail, and initially to FIGS. 1 and 2 thereof, it will be seen that a satellite broadcast receiver 1 in accordance with an embodiment of this invention may include a housing 2 of generally thin box-like configuration having a front wall or panel 2a at which there are provided an array of channel selection buttons 3 adapted to be selectively depressed or actuated for selecting a desired channel from among the odd-numbered channels "1", "3", "5", —"15". An indicator 4 is also disposed on the panel 2a and displays the number of the channel selected for reception by selective actuation of the buttons 3. A plurality of mode indicating devices 5 are also provided on the front panel 2a of the housing 2 for indicating the mode of the audio (A or B mode) signal being received as part of the broadcast television signal and which is selected by actuation of an audio mode change-over button (not shown), and further for indicating whether the received audio signal is a stereo, monaural or bilingual signal.

The broadcast satellite receiver 1 in accordance with this invention is further shown to include a mode selecting or change-over switch 6 mounted on the front panel 2a of the housing 2 and including a control button 6' which is laterally movable in respect to the panel 2a. More specifically, the control button 6' is movable between the position shown on FIG. 1 for selecting an interlocking mode of the receiver 1 when it is intended to operate the broadcast tuner 1 in an interlocking relationship with an external appliance, as hereinafter described in detail, and the position indicated at 6" when it is desired to change-over the receiver 1 to a non-interlocking mode in which the receiver 1 can be operated independently of an external appliance connected thereto.

Also mounted on the front panel 2a of the housing 2 is a stand-by power detecting switch 7 which, as hereinafter described in detail, is actuable for causing detection of the stand-by power consumption of an external appliance connected with the receiver 1.

Referring now to FIG. 2, it will be seen that an interlocking socket or receptacle 8 is provided on a rear wall 2b of the housing 2 for supplying a power source voltage to an external appliance. Also mounted on the rear wall 2b is a broadcast satellite-IF input terminal 9 which, as hereinafter described, may be connected to a broadcast satellite converter of a broadcast satellite antenna for receiving the first intermediate frequency of the 1 GHz band, that is, the so-called BS-IF signal. A television output terminal 10 is provided on the rear wall 2b of the housing 2 so that, when the terminal 10 is connected to a VHF/UHF antenna input terminal of a television receiver a satellite broadcast program can be viewed on the television receiver. A video output terminal 11 and a pair of audio output terminals 12 are provided on the rear wall 2b for delivering video and audio output signals from the broadcast satellite receiver 1 to an associated external appliance, such as, a VTR, as hereinafter described in detail.

An automatic gain control (AGC) output terminal 13 is provided on the rear wall 2b of the housing for providing a DC voltage corresponding to the magnitude of the BS-IF signal delivered to the input terminal 9, and such DC voltage from the AGC output terminal 13 can be utilized, in a known manner, for automatically adjusting the orientation of a broadcast satellite antenna so as to maximize the magnitude of the input signal to the terminal 9.

A power cord 14 extends out of the rear wall 2b and terminates in a plug 14a for engagement in a conventional receptacle (not shown) supplied with household AC current.

Figure 3:
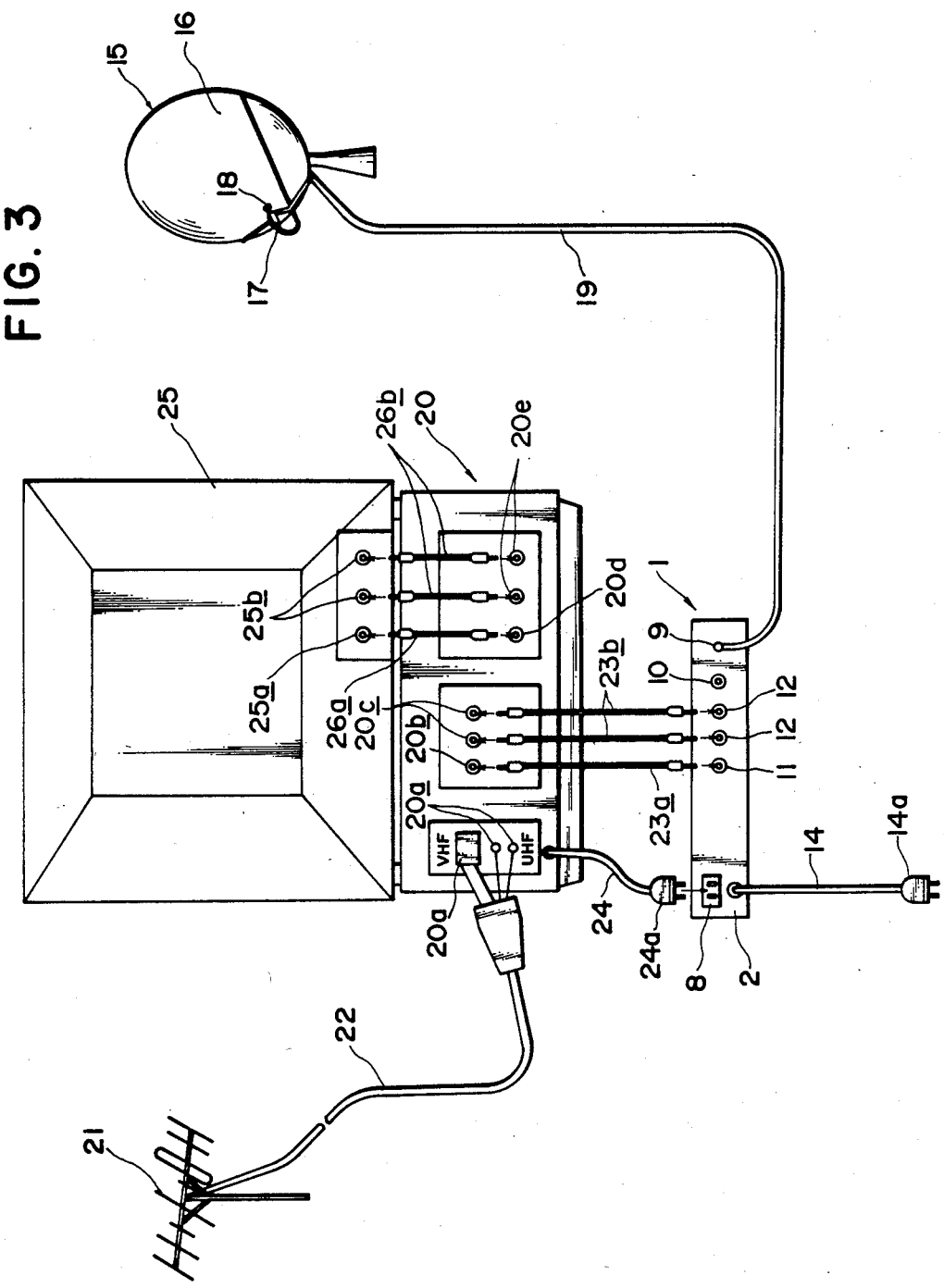
FIG. 3 is a rear elevational view of a video system embodying this invention, and which includes the broadcast satellite receiver of FIGS. 1 and 2 connected with external appliances in the form of a VTR and monitor.

Referring now to FIG. 3, it will be seen that the BS receiver 1 embodying this invention is desirably associated with a broadcast satellite antenna 15 in the form of a so-called parabolic antenna having a reflector 16 in the form of a parabolic dish, and a broadcast satellite converter 17 for amplifying a radio wave received by the antenna 15 and converting the same into a BS-IF signal. A primary radiator 18 is mounted at an end of the BS converter 17 and is positioned at a focus of the reflector 16. A coaxial cable 19 is connected, at one end, to an output terminal of the converter 17 and, at the other end, to the BS-IF input terminal 9 of the receiver 1.

The receiver 1 according to the present invention is further shown on FIG. 3 to be associated with an external appliance in the form of a VTR 20 for recording a television program received by the receiver 1 from a broadcast satellite by way of the antenna 15. The VTR 20 is shown to have radio frequency (RF) input terminals 20a adapted to be connected to a VHF/UHF antenna 21 by way of a coaxial cable 22 so that a television signal received by the antenna 21 in a VHF or UHF channel can also be recorded by the VTR 20.

The VTR 20 is also shown to have a video input terminal 20b connected by way of a cable 23a with the video signal output terminal 11 and audio input terminals 20c connected by way of cables 23b with the audio output terminals 12 of the receiver 1 so that the video and audio signals thus transmitted to the VTR 20 can be recorded by the latter.

A power cord 24 extends from the VTR 20 and terminates in a plug 24a which is insertable in the interlocking socket or receptacle 8 of the receiver 1 for receiving a power supply voltage, for example, of 100 volts AC, via the receiver 1.

A television monitor 25 is also connected to the VTR 20 by means of a cable 26a connected, at one end, to a video input terminal 25a provided on the television monitor 25 and, at the other end, to a video output terminal 20d provided on the VTR 20. Similarly, cables 26b are connected, at one end, to audio input terminals 25b on the monitor 25 and, at the other end, to audio output terminals 20e on the VTR 20. Thus, a radio wave broadcast by satellite and received by the antenna 15 is transmitted as a BS-IF signal from the BS converter 17 to the receiver 1 by way of the coaxial cable 19, and such BS-IF signal is then suitably processed by the receiver 1 to provide a corresponding video signal and audio signal or signals which are transmitted to the VTR 20 and, from the latter, to the television monitor 25.

Figure 4:
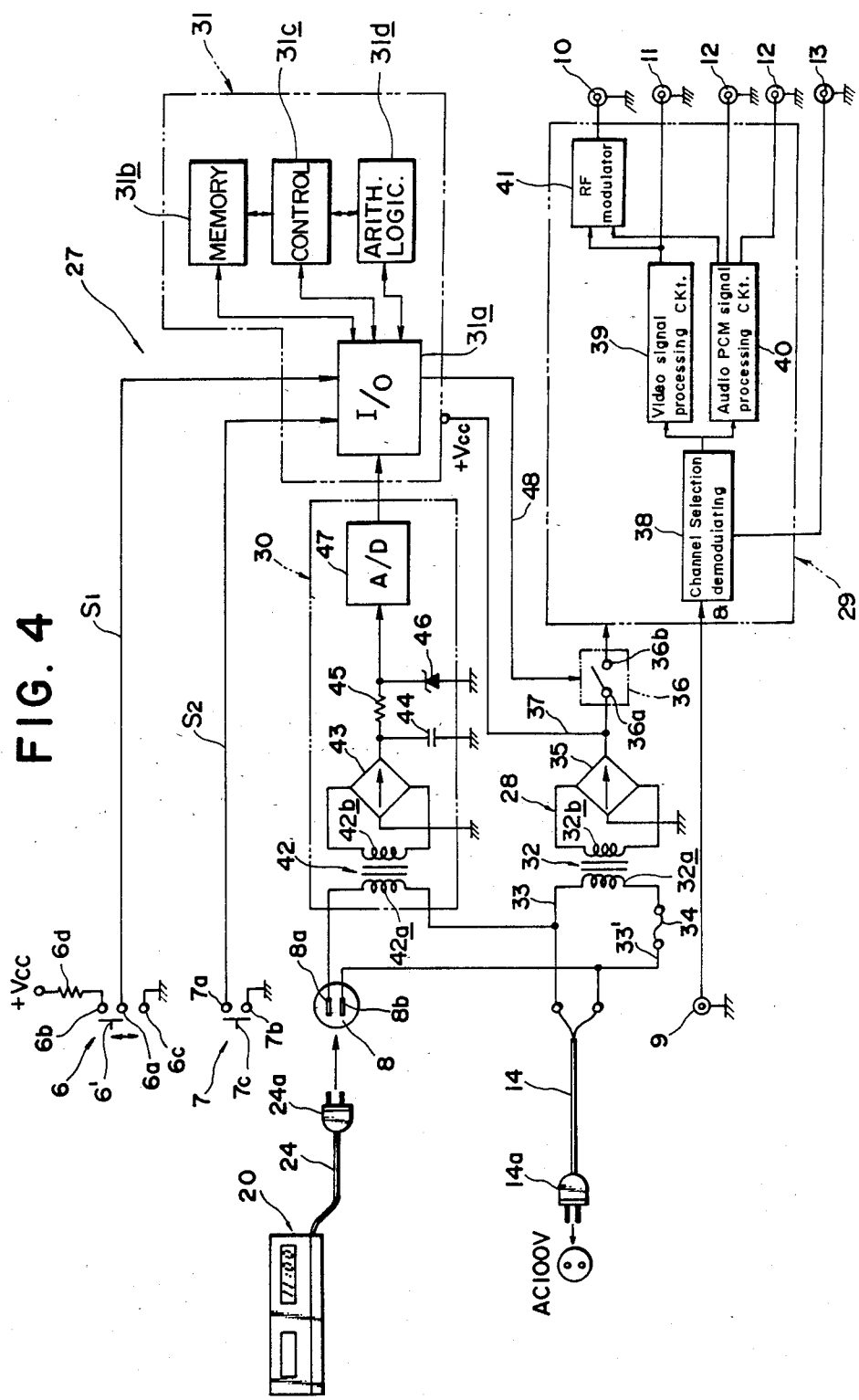
FIG. 4 is a block diagram showing the circuit arrangement of the broadcast satellite receiver of FIGS. 1 and 2.

Referring now to FIG. 4, it will be seen that the BS receiver 1 in accordance with this invention has a circuit arrangement 27 that generally comprises a power source circuit 28, a tuner circuit 29, a power consumption detecting circuit 30 and a controlling circuit 31.

The power source circuit 28 is shown to include a power source transformer 32 having a primary winding 32a connected, at its opposite ends, through lines 33 and 33', to the power cord 14, and through the latter to a 100V AC power source. A fuse 34 is desirably interposed in the line 33. A rectifying circuit 35, which may be conventionally composed of a diode bridge, a regulator, and the like (not shown), has its input terminals connected to the opposite ends of a secondary winding 32b of the transformer 32. The rectifying circuit 35 has a pair of output terminals respectively connected to ground and to a movable contact 36a of a power source switch 36. The output terminal of the rectifying circuit 35 which is connected to the switch 36 is also connected through a line 37 to a power input terminal of the controlling circuit 31 so that stand-by power is supplied, at all times, from the rectifying circuit 35 through the line 37 to the controlling circuit 31 for operation of the latter. As hereinafter described in detail, the power source switch 36 is associated with the controlling circuit 31 so that the switch 36 is opened and closed in response to respective signals from the controlling circuit 31.

The tuner circuit 29 is shown to be connected with a fixed contact 36b of the power source switch 36 so that, when the latter is closed, a suitable power source voltage, for example, of 15V, is supplied from power source circuit 28 through switch 36 to the tuner circuit 29 for operating the various circuits of the latter. Such circuits of the tuner circuit 29 are shown to include a channel selection and demodulating circuit 38 having an input connected to the terminal 9 for receiving a BS-IF signal from the latter, a video signal processing circuit 39 and an audio pulse code modulated (PCM) signal processing circuit 40 connected to an output of the circuit 38. An output of the video signal processing circuit 39 is connected to the video output terminal 11, and a pair of stereo outputs of the audio PCM signal processing circuit 40 are connected to the audio output terminals 12, respectively. The tuner circuit 29 is further shown to include an RF-modulator 41 having inputs respectively connected to the output of the video signal processing circuit 39 and to a monaural audio output of the audio PCM signal processing circuit 40 for providing a television signal to the output terminal 10. Further, an AGC output signal to be provided at the output terminal 13 for controlling the orientation of the antenna 15 may be derived from the channel selection and demodulating circuit 38, as shown on FIG. 4.

The power source voltage of 15V obtained at the output of the rectifying circuit 35 of the power source circuit 28 may also be suitably supplied to the broadcast satellite converter 17.

The power consumption detecting circuit 30 is shown to include a detecting transformer 42 having a primary winding 42a connected, at one end, to the line 33 extending from the power cord 14 to the primary winding 32a of the power source transformer 32 and, at its other end, to a contact 8a of the interlocking socket or receptacle 8. The socket or receptacle 8 is shown to have another contact 8b connected directly to the line 33' extending between the power cord 14 and the primary winding 32a. A rectifying circuit 43 has a pair of input terminals respectively connected to the opposite ends of a secondary winding 42b of the detecting transformer 42. The rectifying circuit 43 has a pair of output terminals, one of which is connected directly to ground, while the other output terminal is connected to ground through a capacitor 44. A resistor 45 is connected, at one end, to a junction between the capacitor 44 and the respective output of the rectifying circuit 43 so as to form an integrating circuit with the capacitor 44. The other end of the resistor 45 is connected to the cathode of a Zener diode 46 which has its anode connected to ground. An analog-to-digital (A/D) converting circuit 47 has its input connected to a junction between the resistor 45 and the Zener diode 46 for converting a voltage level at such junction into a digital signal of 6-bits or the like. Such digital output of converting circuit 47 represents a detected value of the power being consumed by an external appliance, for example, the VTR 20 having its plug 24a engaged in the interlocking receptacle 8 so as to draw its power from the latter, and hence through the primary winding 42a of the transformer 42.

It is to be noted that a voltage comparator (not shown) may be employed in place of the A/D converting circuit 47 for comparing the voltage level at the junction between the resistor 45 and the Zener diode 46 with a predetermined reference voltage, and for providing an output corresponding to the result of such comparison and which indicates the detected value of power consumption.

It will be appreciated that stand-by power consumption of an external appliance connected with the interlocking receptacle 8 may vary substantially in accordance with the nature of the external appliance. Therefore, in order to make the BS receiver 1 embodying this invention suitable for use with various types of external appliances, it may be desirable to provide a plurality of resistors (not shown) having respectively different resistance values and being selectively interposed between the Zener diode 46 and the A/D converting circuit 47 by means of a change-over switch (also not shown) for suitably changing the range of voltages to be detected.

The controlling circuit 31 may be in the form of a microprocessor or CPU that conventionally includes an input/output (I/O) unit 31a, a memory 31b, a control unit 31c and an arithmetic logic unit 31d which are mutually connected with each other. The mode selecting or change-over switch 6 is shown to include a common fixed contact 6a disposed midway between fixed contacts 6b and 6c so that a movable contact connected with the control button 6' may selectively bridge the fixed contacts 6a and 6b or the fixed contacts 6a and 6c. The fixed contact 6b is connected through a resistor 6d to a suitable voltage source, for example, the line 37 extending from the output terminal of the rectifying circuit 35 to a power input terminal of the controlling circuit 31. The common contact 6a of the mode selecting switch 6 is connected to an input port of the I/O unit 31a, while the remaining contact 6c is connected to ground.

The stand-by power detecting switch 7 is shown on FIG. 4 to include fixed contacts 7a and 7b respectively connected to an input port of the I/O unit 31a and to ground, and a movable contact 7c normally spaced from the fixed contact 7a and 7b, and being adapted to bridge the contacts 7a and 7b when an associated push-button is manually depressed.

The I/O unit 31a of the controlling circuit 31 is shown to have another input port receiving the digital output of the A/D converting circuit 47, and an output port from which a line 48 extends to the power source switch 36 for controlling the latter in response to a control signal from the circuit 31.

It will be appreciated that, when the control button 6' of the mode selecting switch 6 is laterally disposed in the position shown on FIG. 4 and then manually depressed to engage or bridge the fixed contacts 6a and 6b, a signal $S_1$ having the logic level "1" or "H" is provided to the respective input port of the unit 31a of controlling circuit 31 to thereby indicate selection of the interlocking mode of operation. On the other hand, when the control button 6' of the mode selecting switch 6 is laterally displaced to the position bridging the fixed contacts 6a and 6c and then depressed so as to engage the contacts 6a and 6c, a signal $S_1$ having the logic level "0" or "L" is input to the unit 31a for indicating that the non-interlocking mode of operation is selected. Similarly, when the push button of the switch 7 is manually depressed for causing the respective movable contact 7c to engage the fixed contacts 7a and 7b, a signal $S_2$ of logic level "0" or "L" is applied to the respective input port of the I/O unit 31a. Such signal $S_2$ of the level "L" indicates to the controlling circuit 31 that the value of the power consumption of the VTR 20 or other external appliance in its stand-by condition is to be detected, and that the corresponding output of the A/D converting circuit 47 is to be stored in the memory 31b.

Figure 5:
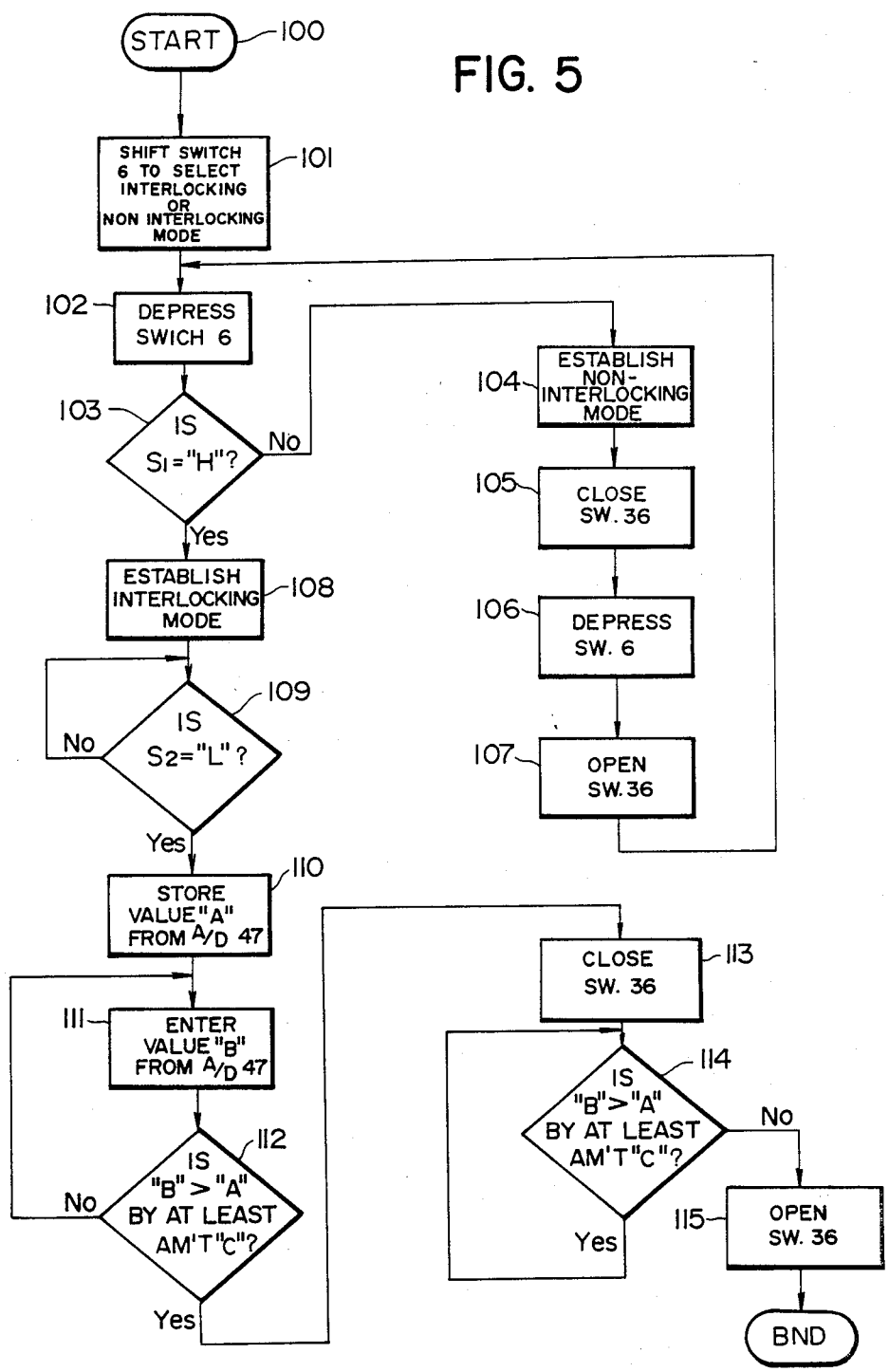
FIG. 5 illustrates a flow chart to which reference will be made in explaining the program of a microprocessor included in the circuit arrangement of FIG. 4.

The operation of the BS receiver 1 in accordance with an embodiment of this invention will now be described with reference to the flow chart of FIG. 5 which illustrates the program of the microprocessor constituting the controlling circuit 31 for both the interlocking mode and the non-interlocking mode. Prior to the start of such program at (100), the VTR 20 or other external appliance has the plug 24a of its power cord 24 engaged in the interlocking receptacle 8 of the BS receiver 1, and the plug 14a of the power cord 14 of the BS receiver is engaged in a household electrical receptacle or other suitable source of household AC current. Furthermore, if the interlocking mode of operation is to be selected, a tape is loaded in the VTR 20, the VTR 20 is placed in its stand-by condition and the built-in timer of the VTR is set for the commencement of recording at a selected time, that is, at the reserved picture recording time. Thereafter, in the step (101), the control button 6' of the mode selecting switch 6 is shifted or displaced to either the position thereof for selecting the interlocking mode, or to the position for selecting the non-interlocking mode. After such selection of the interlocking or non-interlocking mode, the control button 6' of the switch 6 is depressed in step (102), and the resulting signal $S_1$ provided from the mode-selecting switch 6 to the I/O unit 31a of the controlling circuit 31 is either at the logic level "H", in the case where the interlocking mode has been selected, or at the logic level "L", in the case where the non-interlocking mode has been selected. In the next step (103) it is determined whether or not the signal $S_1$ is at the logic level "H". If the signal $S_1$ is not at the logic level "H", that is, if the signal $S_1$ is at the logic level "L", the program passes to the step (104) in which the non-interlocking mode is established. Thereupon, as in the following step (105), the controlling circuit 31 provides a signal through the line 48 to the power source switch 36 for closing the latter and thereby supplying a power source voltage from the power source circuit 28 through closed switch 36 to the tuner circuit 29 for operating the latter.

Upon such operation of the tuner circuit 29, the channel selection and demodulating circuit 38 thereof selects, from a BS-IF signal applied to the input terminal 9 from the BS converter 17, the signal of a desired channel selected by actuation of a corresponding one of the channel selection buttons 3 so that the received BS-IF signal is converted into a second intermediate frequency. Thereupon, the circuit 38 effects FM demodulation of the BS-IF signal for extracting therefrom a video signal and an audio PCM sub-carrier signal. Finally, circuit 38 conventionally effects separation of the video signal from the audio PCM sub-carrier signal and the separated video signal is supplied to the video signal processing circuit 39 in which deemphasis is effected and energy dispersal signals are removed from the video signal. The resulting video signal is then supplied from the processing circuit 39 to the video output terminal 11. Simultaneously, the separated audio PCM sub-carrier signal is converted or decoded and then PCM demodulated in the audio PCM signal processing circuit which finally converts the digital audio signal to analog stereo audio signals which are applied to the audio output terminals 12. Thus, the video signal and the audio signals are transmitted from the output terminals 11 and 12 of the tuner circuit 29 to the input terminals 20b and 20c of the VTR 20 by way of connecting cables 23a and 23b, respectively.

During the operation of the BS receiver 1 in its non-interlocking mode, the VTR 20 connected therewith may be made operative either by operation of the built-in timer thereof, or by suitable manual actuation of the controls of the VTR 20 so as to record the video and audio signals being applied to the input terminals 20b and 20c, respectively. Further, at such time, the monitor 25 may be made operative to reproduce the video and audio signals being applied to the VTR 20 from the BS receiver 1.

At any time during the operation of the BS receiver 1 in its non-interlocking mode, the depressing of the control button 6' provides a second signal $S_1$ of the logic level "L" to the respective input port of the I/O unit 31a and the microprocessor or CPU constituting the controlling circuit 31 responds to such second signal $S_1$ of the logic level "L" by supplying a suitable control signal through the line 48 to the power source switch 36 for opening the latter, as in the step (107). Thus, in response to the second actuation of the control button 6' of the switch 6 in its condition for selecting the non-interlocking mode of the BS receiver 1, the operation of the tuner circuit 29 is halted and the program returns or is recycled to the step (102).

If the switch 6 has been conditioned for selecting the interlocking mode of operation of the BS receiver 1 embodying this invention at the time when the control button 6' is initially depressed in step (102), it is determined, in the succeeding step (103), that the resulting signal $S_1$ is at the logic level "H" and the microprocessor or CPU forming the controlling circuit 31 responds thereto in the step (108) by establishing the interlocking mode. With the plug 24a of the VTR 20 engaged in the interlocking receptacle 8 of the BS receiver 1, and with the VTR 20 in its stand-by condition in which it has a power consumption of approximately 5 Watts, the electric current drawn by the VTR 20 in its stand-by condition flows through the primary winding 42a of the detecting transformer 42 and is converted into a corresponding DC voltage by way of the rectifying circuit 43, the integrating circuit constituted by the capacitor 44 and the resistor 45 and the Zener diode 46. Such DC or analog voltage is converted into corresponding digital data by the A/D converting circuit 47. When the stand-by power detecting switch 7 is depressed or actuated, it is determined, as in the step (109), that the signal $S_2$ is at the logic level "L⇌", and such signal $S_2$ applied to the respective input port of the I/O unit 31a causes the control unit 31c to store the data then being received from the A/D converting circuit 47 in the memory 31b, as in the step (110). In other words, at the time of the actuation of the switch 7 with the receiver 1 in its interlocking mode, the controlling circuit 31 stores in the memory 31b the data from the converting circuit 47 which corresponds to the value "A" of the power consumption of the VTR 20 in its stand-by condition.

It will be noted that, during the detecting of the power consumption by the VTR 20 in its stand-by condition and the storing of the corresponding value "A" in the memory 31b, the controlling circuit 31 maintains the power source switch 36 in its open condition so that the tuner circuit 29 remains inoperative. After storing in the memory 31b of the value "A" characteristic of the stand-by condition of the VTR 20, the A/D converting circuit 47 continues to supply to the respective input port of the I/O unit 31a data representing the instantaneous value "B" of the power consumption by the VTR 20, and the control unit 31c enters such value "B" in the arithmetic logic unit 31d, as in the step (111). In the following step (112), it is continuously determined whether or not the instantaneous value "B" of power consumption being entered from the converting circuit 47 is greater than the previously stored value "A" by at least a predetermined amount "C", as is the case when the value "B" is characteristic of the power consumption by the VTR 20 in its operating condition. In other words, at the reserved picture recording time for which the built-in timer of the VTR 20 has been set, the VTR is changed-over from its stand-by condition to its operating condition. The resulting substantial increase in the power consumption of the VTR 20 is detected by the circuit 30 so that the value "B" of the data then being supplied from the circuit 30 to the I/O unit 31a of the controlling circuit 31 exceeds the previously stored value "A" by at least the predetermined amount "C". In response to the foregoing determination by the arithmetic logic unit 31d in the step (112), the control unit 31c provides a suitable control signal through the line 48 to the power source switch 36 for closing the latter, as in the step (113). Such closing of the switch 36 causes operation of the tuner circuit 29 substantially in the same manner as has been described above for the non-interlocking mode of the receiver 1.

The predetermined amount "C" by which the value "B" has to exceed the previously stored value "A" in order to achieve closing of the power source switch 36 in the step (113) is selected to ensure that the closing of the switch 36, and the consequent operation of the tuner circuit 29 in the interlocking mode of the receiver, occurs only when the value "B" is truly characteristic of the operation of the VTR 20. Thus, the closing of the switch 36 in response to a voltage fluctuation or surge or any condition other than the operation of the VTR 20 is avoided.

After the switch 36 has been closed for initiating the operation of the tuner circuit 29 in the interlocking mode of the receiver 1, the instantaneous value "B" of the data output from the detecting circuit 30 is continuously compared in the step (114) with the previously stored value "A". So long as the value "B" is determined, in the step (114), to be greater than the stored value "A" by at least the predetermined amount "C", the controlling circuit 31 maintains the power source switch 36 in its closed condition for continuing the operation of the tuner circuit 29. However, when the built-in timer of the VTR 20 halts the operation of the latter so that its power consumption is reduced, for example, to approximately the value "A" characteristic of the stand-by condition of the VTR 20, the fact that the value "B" is no longer greater than the stored value "A" by at least the predetermined amount "C" is determined in the step (114) and, in response to such determination, the power source switch 36 is opened in the step (115) for halting the operation of the tuner circuit 29 and the program of the controlling circuit 31 is brought to an end.

It will be appreciated from the foregoing that, in the BS receiver 1 embodying this invention, the operation of the tuner circuit 29 is automatically controlled in response to the operation of the associated VTR 20 or other external appliance when the receiver 1 is in its interlocking mode. Although the invention has been described and illustrated as applied to a broadcast satellite receiver, it is apparent that the invention can be similarly applied to other types of receivers for association with a VTR or other external appliance.

Although a preferred embodiment of the invention has been described in detail herein with reference to the accompanying drawings, it will apparent that the invention is not limited to that precise embodiment, and that various changes and modifications may be effected therein by one skilled in the art without departing from the spirit or scope of the invention as defined in the appended claims.

What is claimed is:

1. A receiver comprising:
a power source circuit;
a tuner circuit;
power switching means for controlling the supplying of a power source voltage from said power source circuit to said tuner circuit for operating the latter;
coupling means for connecting an external appliance to said power source circuit of the receiver;
detecting means for detecting values of power consumption by the external appliance connected through said coupling means to said power source circuit; and
controlling means responsive to said values of power consumption detected by said detecting means for closing said power switching means, and thereby operating said tuner circuit, when the detected value of power consumption exceeds, by a predetermined amount, a previously detected value of power consumption of the external appliance in a standby condition.

2. A receiver according to claim 1; in which said detected value of power consumption which exceeds, by a predetermined amount, said previously detected value of power consumption is characteristic of an operating condition of said external appliance so that said tuner circuit and said external appliance are operative in an interlocking manner.

3. A receiver according to claim 2; further comprising mode selecting means connected with said controlling means and being selectively operative to establish an interlocking mode, in which said tuner circuit is operative in said interlocking manner with said external appliance, and a non-interlocking mode in which said tuner circuit is operative independently of said external appliance.

4. A receiver according to claim 3; further comprising start-stop means associated with said mode selecting means and being operative, in said non-interlocking mode, to cause said controlling means to close said power switching means for operating said tuner circuit in response to an initial actuation of said start-stop means and to open said power switching means for halting operation of said tuner circuit in response to a subsequent actuation of said start-stop means.

5. A receiver according to claim 1; further comprising means actuable to cause said controlling means to store said previously detected value of power consumption of the external appliance in said standby condition.

6. A receiver according to claim 1; in which said power source circuit includes an AC source; and said detecting means includes transformer means connected between said AC source and said coupling means for converting electric current supplied from said AC source through said
coupling means to an external appliance into a voltage signal, rectifying means for converting said voltage signal into a DC voltage signal, integrating means for integrating said DC voltage signal, and analog-to-digital converting means for converting the integrated DC voltage signal into a digital signal supplied to said controlling means.

7. A video system comprising a video recorder including a timer for determining a period of operation thereof; and a receiver including a power source circuit, a tuner circuit operative to receive a broadcast signal and to provide a video signal to said video recorder, power switching means for controlling the supplying of a power source voltage from said power source circuit to said tuner circuit for operating the latter, coupling means connecting said video recorder to said power source circuit, detecting means for detecting values of power consumption by said video recorder connected through said coupling means to said power source circuit, and controlling means responsive to said values of power consumption detected by said detecting means for closing said power switching means and thereby operating said tuner circuit when the detected value of power consumption is characteristic of an operating condition of said video recorder so that operation of said tuner circuit is made to be simultaneous with said period of operation of the video recorder determined by said timer of the latter.

8. A video system according to claim 7; in which said receiver further includes means for initially storing in said controlling means a detected value of power consumption characteristic of a standby condition of said video recorder, and said controlling means closes said power switching means for operating said tuner circuit when the detected value of power consumption exceeds by a predetermined amount the initially stored value of power consumption in said standby condition.

9. A video system according to claim 8; in which said receiver further includes mode selecting means connected with said controlling means and being selectively operative to establish an interlocking mode in which said tuner circuit is operative with said video recorder during said period of operation determined by said timer, and a non-interlocking mode in which said tuner circuit is operative independently of said video recorder.

10. A video system according to claim 9; in which said receiver further includes start-stop means associated with said mode selecting means and being operative, in said non-interlocking mode, to cause said controlling means to close said power switching means for operating said tuner circuit in response to an initial actuation of said start-stop means and to open said power switching means for halting operation of said tuner circuit in response to a subsequent actuation of said start-stop means.

11. A video system according to claim 7; in which said power source circuit includes an AC source; and said detecting means includes transformer means connected between said AC source of the power source circuit and said coupling means for converting electric current supplied from said AC source through said coupling means to said video recorder into a voltage signal, rectifying means for converting said voltage signal into a DC voltage signal, integrating means for integrating said DC voltage signal, and analog-to-digital converting means for converting the integrated DC voltage signal into a digital signal supplied to said controlling means.

* * * * *